United States Patent
Pidria et al.

(10) Patent No.: US 11,867,108 B1
(45) Date of Patent: Jan. 9, 2024

(54) POLLUTANT ABATEMENT DEVICE OF AN INTERNAL COMBUSTION ENGINE AND POLLUTANT ABATEMENT SYSTEM COMPRISING THE DEVICE

(71) Applicant: FPT INDUSTRIAL S.P.A., Turin (IT)

(72) Inventors: Marco Federico Pidria, Turin (IT); Edoardo Merlone Borla, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 18/549,174

(22) PCT Filed: Apr. 5, 2022

(86) PCT No.: PCT/IB2022/053164
§ 371 (c)(1),
(2) Date: Sep. 6, 2023

(87) PCT Pub. No.: WO2022/219458
PCT Pub. Date: Oct. 20, 2022

(30) Foreign Application Priority Data

Apr. 14, 2021 (IT) .................. 102021000009395

(51) Int. Cl.
*F01N 3/20* (2006.01)
*F01N 3/10* (2006.01)
*F01N 3/28* (2006.01)
*B01D 53/94* (2006.01)

(52) U.S. Cl.
CPC .......... *F01N 3/208* (2013.01); *B01D 53/944* (2013.01); *B01D 53/9431* (2013.01); *B01D 53/9436* (2013.01); *B01D 53/9477* (2013.01); *F01N 3/106* (2013.01); *F01N 3/2013* (2013.01); *F01N 3/2892* (2013.01); *B01D 2251/2067* (2013.01); *B01D 2255/915* (2013.01);

(Continued)

(58) Field of Classification Search
CPC ........ F01N 3/208; F01N 3/106; F01N 3/2013; F01N 3/2892; F01N 2610/02; F01N 2610/146; F01N 2900/1602; B01D 53/9431; B01D 53/9436; B01D 53/944; B01D 53/9477; B01D 2251/2067; B01D 2255/915
See application file for complete search history.

(56) References Cited

U.S. PATENT DOCUMENTS 10,322,403 B2 * 6/2019 Maunula .................. B01J 23/30
2020/0300141 A1 9/2020 Gaiser

FOREIGN PATENT DOCUMENTS

| CN | 110206621 A | 9/2019 |
| DE | 102009032022 A1 | 1/2011 |
| DE | 102018120195 A1 | 2/2020 |

* cited by examiner

*Primary Examiner* — Brandon D Lee
(74) *Attorney, Agent, or Firm* — Bayramoglu Law Offices LLC

(57) ABSTRACT

Device for the abatement of pollutants of an internal combustion engine comprising an external casing in which a DOC and a bypass duct of the DOC is housed to define a bifurcation for the exhaust gases passing through the device, so that a first flow is intended to cross the DOC and a second flow is intended to bypass the DOC, an injector of urea-based reducing agent arranged at or at a point immediately downstream of the bifurcation and an electric heater arranged annularly with respect to the bypass duct and configured to heat the bypass duct and to be passed by the first exhaust gas flow.

14 Claims, 4 Drawing Sheets

(52) U.S. Cl.
CPC .... *F01N 2610/02* (2013.01); *F01N 2610/146* (2013.01); *F01N 2900/1602* (2013.01)

POLLUTANT ABATEMENT DEVICE OF AN INTERNAL COMBUSTION ENGINE AND POLLUTANT ABATEMENT SYSTEM COMPRISING THE DEVICE

CROSS REFERENCE TO THE RELATED APPLICATIONS

This application is the national phase entry of International Application No. PCT/IB2022/053164, filed on Apr. 5, 2022, which is based upon and claims priority to Italian Patent Application No. 102021000009395, filed on Apr. 14, 2021, the entire contents of which are incorporated herein by reference.

TECHNICAL FIELD

The present invention relates to the field of pollutant abatement systems (ATS) for internal combustion engines and to internal combustion engines including the abatement system.

BACKGROUND

The regulations relating to harmful emissions from land vehicles are becoming increasingly restrictive and therefore it becomes imperative to identify individual devices or sets of interconnected devices in order to reduce pollutant emissions.

The devices typically found in diesel cycle internal combustion engines are:
DPF=particle filter,
DOC=diesel oxidation catalyst,
SCR=selective catalyst that exploits the presence of ammonia to reduce the NOx contained in the exhaust gases,
SCRoF i.e. a selective SCR catalyst made on a filter matrix similar to the DPF,
CUC=ammonia abatement, it is generally used as the last component of the ATS in order to avoid releasing ammonia into the environment, which would contribute to increase the counting of pollutants released into the environment.

They are well known to those skilled in the art and the respective acronyms are acronyms of equally well-known Anglo-Saxon expressions.

One of the fundamental problems for the reduction of NOx is the correct hydrolyzation of the reducing agent based on urea.

The latest regulations provide that the ATS must be efficient as soon as possible, accounting for the pollutants emitted during the heating of the ATS.

Devices to facilitate hydrolysis are known. The use of electric heaters is known. For example, EP2826973 shows the use of electric coils arranged in the cone of the urea-based reducing agent spray.

If not specifically excluded in the detailed description that follows, what is described in this chapter is to be considered as an integral part of the detailed description.

SUMMARY

The purpose of the present invention is to improve the pollutant abatement devices and in particular the purpose is to improve the hydrolysis of the urea-based reducing agent injected to reduce the NOx content.

The basic idea of the present invention is to present an exhaust gas abatement device comprising at least one DOC and an exhaust gas bypass duct to define a bifurcation for the exhaust gases, so that a first flow is intended to pass the DOC matrix and a second flow bypasses the DOC matrix. The urea-based reducing agent injector is arranged at or at a point immediately downstream of the bifurcation.

Furthermore, the bypass duct is inserted into an electric heater designed to heat the bypass duct and to be crossed by the first flow of exhaust gas.

The first and second flow of exhaust gas are mixed in the terminal part of the device before leaving it.

The device object of the present invention is the first device of the ATS, which the exhaust gas produced by the internal combustion engine meets.

The fact of injecting the urea-based reducing agent into the second flow which comes directly from the internal combustion engine and which bypasses the DOC guarantees the maximum thermal content, as this flow, when cold, does not have to heat the DOC matrix.

The heater is preferably arranged to primarily heat the bypass duct and secondly the first exhaust gas stream.

It is worth highlighting that in a typical diesel engine exhaust after treatment system consisting of a diesel oxidation catalyst DOC, the main purpose of the DOC, in addition to the oxidation of CO to $CO_2$, is the oxidation of NO to $NO_2$. The conversion from NO to $NO_2$ is an essential contribution to the downstream SCR system because the rapid reaction to the SCR provides the highest conversion rates of NOx to $H_2O$ and $N_2$. This rapid reaction works well only at approximately equal concentrations of NO and $NO_2$.

If the DOC does not reach an adequate operating temperature, it is unable to balance the concentrations of NO and $NO_2$, compromising the functioning of the SCR even in the presence of sufficient ammonia.

Preferably, the device is designed as a rotational solid in which the bypass duct is arranged well away from the perimeter walls of the external envelope, generally referred to as "canning" and is preferably arranged axially.

More preferably, the device comprises an exhaust gas inlet duct, arranged to introduce the exhausted gas in an incident manner with respect to the aforementioned axial direction and the reducing agent injector is arranged coaxially with respect to the bypass duct at the bifurcation.

According to a preferred variant of the invention, downstream of the device containing the DOC there is at least one further device containing an SCR with a CUC and, further downstream, a Platinum or Platinum and Palladium catalyzed DOC and DPF.

According to a further variant of the invention, downstream of the DPF there is a further SCR with a CUC with an additional urea-based reducing agent doser to be activated when the ATS is sufficiently hot. When the ATS is hot enough, it is advantageous to deactivate the first urea-based reducing agent doser to promote spontaneous regeneration in the DPF.

According to another preferred variant of the invention, at least one further device containing a component known as SCRoF, from the acronym SCR on Filter, is arranged downstream of the device containing the DOC, i.e. an SCR having filtering capacity for the particulate contained in the exhausted gas. Preferably, a further SCR with CUC is arranged downstream of the SCRoF as described with the relative dosing device of urea-based reducing agent to be activated and for the benefits described above.

The dependent claims describe preferred variants of the invention, forming an integral part of this description.

BRIEF DESCRIPTION OF THE DRAWINGS

Further objects and advantages of the present invention will become clear from the following detailed description of an example of its embodiment (and its variants) and from the attached drawings given purely by way of non-limiting explanation, in which.

The same reference numbers and letters in the figures identify the same elements or components or functions.

It should also be noted that the terms "first", "second", "third", "upper", "lower" and the like can be used here to distinguish various elements. These terms do not imply a spatial, sequential or hierarchical order for the modified elements unless specifically indicated or inferred from the text.

The elements and features illustrated in the various preferred embodiments, including the drawings, can be combined with each other without however departing from the scope of this application as described below.

DETAILED DESCRIPTION OF THE EMBODIMENTS

Figure 1:
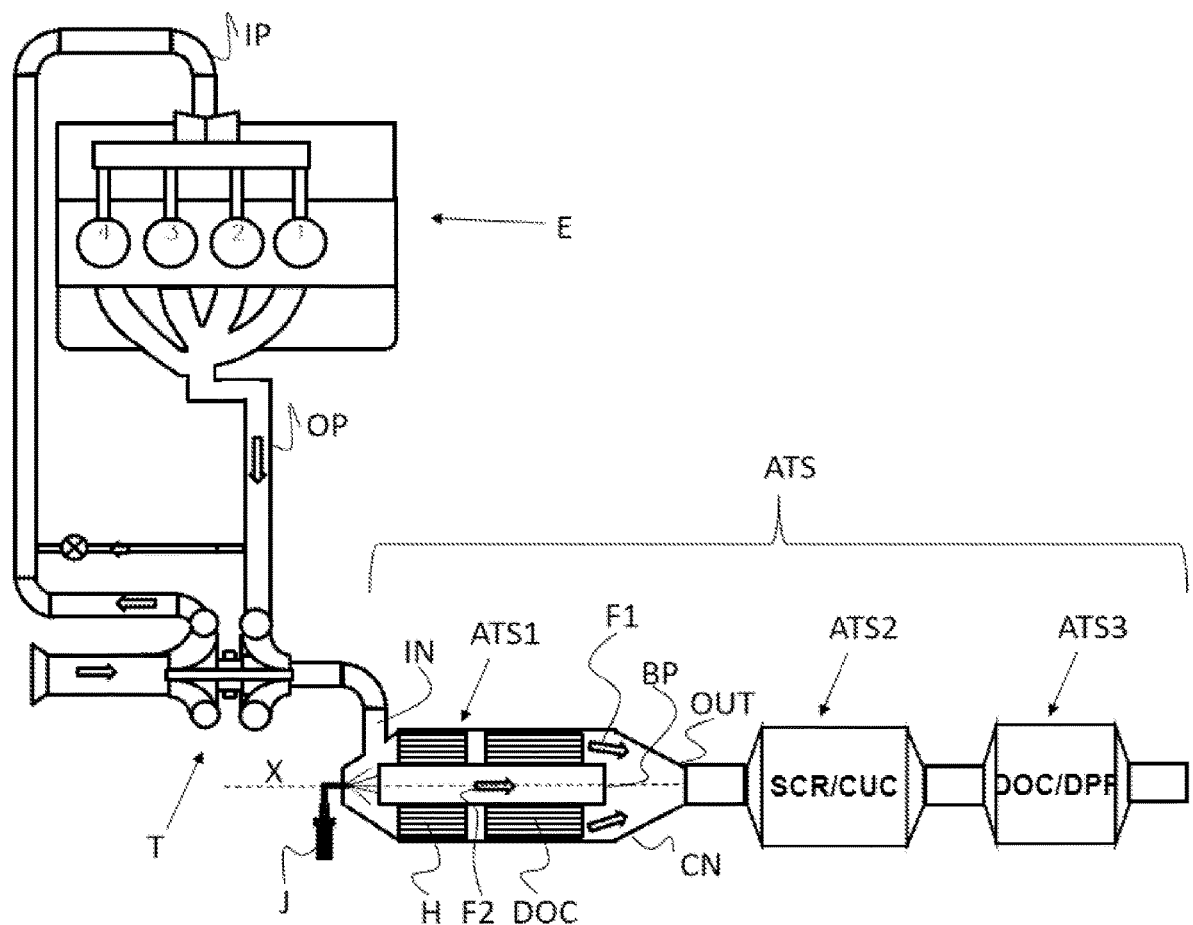
FIG. 1 shows a first diagram comprising an internal combustion engine and the exhaust gas abatement device according to a first variant of the present invention.

FIG. 1 shows an example of a diesel cycle internal combustion engine E, hereinafter simply "engine E", comprising an intake manifold IP and an exhaust manifold OP.

Preferably, the engine E is supercharged with a turbocharger T comprising a turbine connected to the exhaust manifold and a compressor, driven in rotation by the turbine, arranged on the intake manifold.

The engine can be equipped with an EGR valve for exhaust gas recirculation.

According to the present invention, the exhaust gas abatement system comprises a first device indicated as ATS1 arranged as the first component of the ATS that the exhaust gas meets in the usual outflow from the engine E to the external environment.

The first device ATS1 comprising at least one DOC and an exhaust gas bypass duct BP to define a bifurcation for the exhaust gases, so that a first flow F1 is intended to pass the DOC matrix and a second flow F2 bypasses the DOC matrix.

The first and second flow mix together in the terminal part of the device before leaving it to enter a possible second ATS2 device, etc.

The injector J of the urea-based reducing agent is arranged at or at a point immediately downstream of the bifurcation.

Furthermore, the bypass duct is inserted in an electric heater H configured to heat the bypass duct and to be passed by the first flow F1 of exhaust gas.

In this way, the heater performs the double function of heating the bypass duct and indirectly the second exhaust gas flow F2 and directly the first exhaust gas flow F1.

The first ATS1 device is preferably designed as a rotational solid in which the BP bypass duct is arranged well away from the perimeter walls of the envelope and is preferably arranged coaxially with respect to the rotation axis of the entire device.

The first device ATS1 comprises an inlet duct IN of the exhausted gas, arranged to enter the exhausted gas in an incident manner with respect to the aforementioned axial direction and the reducing agent injector is arranged coaxially with respect to the bypass duct at the bifurcation.

From the figures it can be seen that the first device ATS1 comprises a sort of bell which closes a base of the rotational solid and in the top of the bell there is the injector J of the urea-based reducing agent, while in a lateral position of the bell there is formed the exhaust gas inlet duct IN.

The injector tip is arranged so that the urea-based reducing agent spray is completely injected into the second flow F2 of exhausted gas.

The bypass duct comprises a first proximal portion to the injector J and a second proximal portion with the terminal portion OUT of the ATS1 device.

The first portion of the bypass duct is inserted into and in contact with an electric heater H. This is arranged primarily to heat the bypass duct and secondly to heat the first exhaust gas stream.

FIGS. 4-7 show a cross-sectional view of the heater H according to different embodiment examples.

Figure 4:
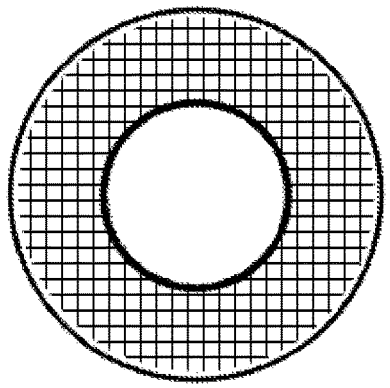
FIGS. 4-7 show construction details of an element of the device according to FIGS. 1-3.
Figure 5:
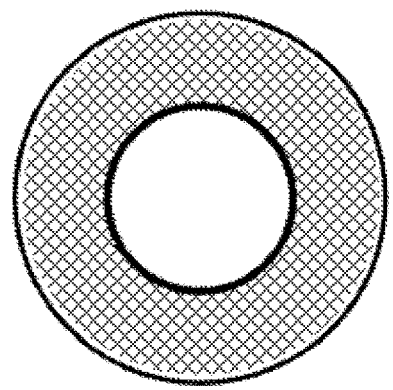
Figure 6:
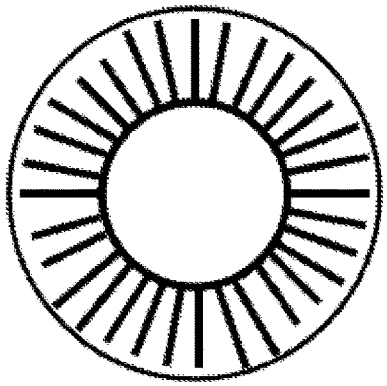
Figure 7:
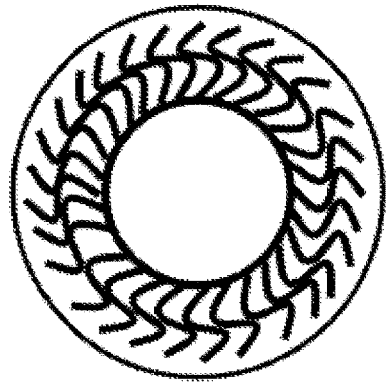

For example, FIGS. 4 and 5 show a matrix heater, while solutions 6 and 7 show a finned heater, in particular in FIG. 6 the straight fins are radial, while in FIG. 7 the fins are folded, each to form an S.

FIG. 1 shows further ATS2 and ATS3 components arranged in succession downstream of the first ATS1 device.

The second ATS2 device placed immediately downstream of the first ATS1 device includes an SCR and a CUC to exploit the preheated gas mixture containing the right proportions of NH3, NO and $NO_2$ in order to maximize the conversion efficiency of the SCR itself, during the first stages of engine start-up.

Downstream of the SCR and CUC there is a DOC/DPF loaded with platinum and/or palladium capable of retaining the solid particles per se known.

Figure 2:
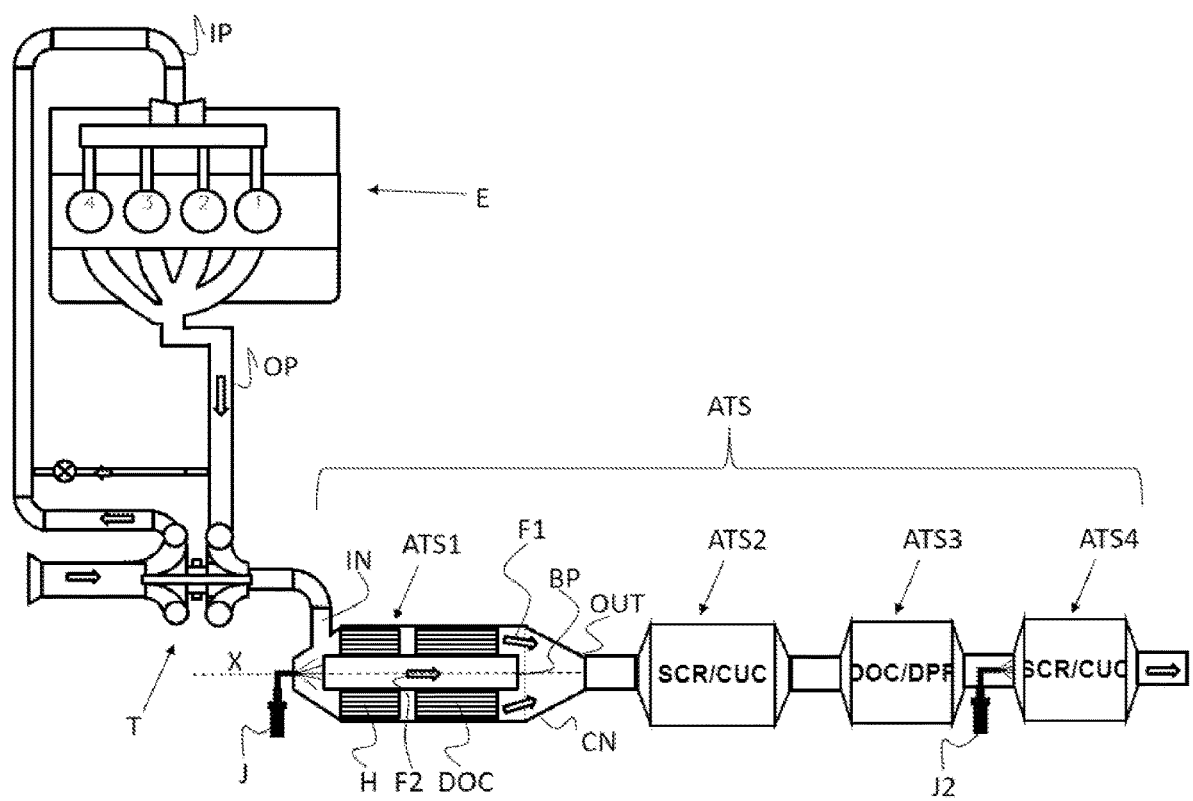
FIG. 2 shows a further preferred variant of the present invention.

According to FIG. 2, which represents a variant of the diagram of FIG. 1, downstream of the third device ATS3 there is a fourth device ATS4 comprising an SCR followed by a CUC and immediately upstream of the fourth device ATS4 there is a second injector J2 of the urea-based reducing agent.

Preferably, the second injector J2 and consequently the fourth device ATS4 are activated after sufficient heating of the same fourth component ATS4.

Preferably, when the fourth component is fully operational, the first injector J of urea-based reducing agent is deactivated, so as to favour the spontaneous regeneration of the DPF contained in the third ATS3 device due to the $NO_2$ effect.

Figure 3:
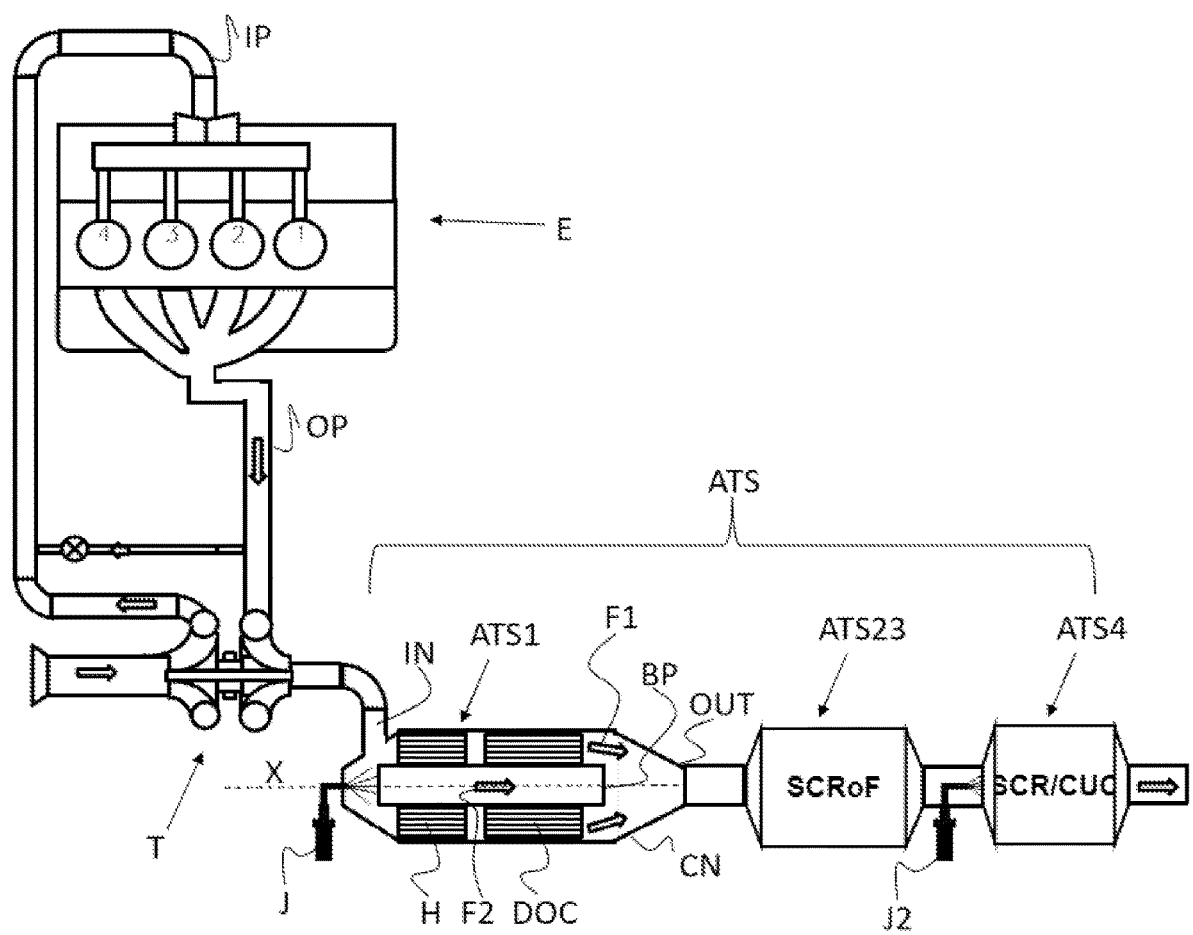
FIG. 3 shows a further preferred variant of the present invention.

FIG. 3 shows another preferred variant of the invention in which there are additional ATS23 and ATS4 components arranged in succession downstream of the first ATS1 device.

The second device ATS23 does not coincide with the second device ATS2 of the previous figures, although arranged, as ATS2, immediately downstream of the first device ATS1. The ATS23 device includes a component known as SCRoF, from the acronym "SCR on Filter", which is an SCR having filtering capacity for the particulate contained in the exhaust gases.

In this way it is possible to exploit the same component both to maximize the conversion efficiency of the SCR by the mixture of preheated gas and containing the right proportions of NH3, NO and $NO_2$ and to filter the solid particles of particulate matter.

Downstream of the SCRoF there is a third device corresponding to the fourth ATS4 in FIG. 2. It includes an SCR and a CUC, also equipped with a second injector J2 of urea-based reducing agent. Also in this case the activation of the second injector is expected when the temperature of ATS4 is sufficient.

Also in this case, it is advantageous to deactivate the first injector when the ATS4 component is completely efficient, in order to favour the spontaneous regeneration of carbon residues in the SCRoF filter by $NO_2$.

This means that a condition of simultaneous operation of both injectors can be foreseen.

Therefore, the first injector J of urea-based reducing agent is configured to activate at cold start and be kept active until the temperature of the fourth device ATS4 is below a first predetermined temperature threshold and in which the second injector J2 of urea-based reducing agent is configured to activate when the temperature of the fourth ATS4 device exceeds a second predetermined temperature threshold lower than the first temperature threshold.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

What is claimed is:

1. A device for an abatement of pollutants produced by an internal combustion engine comprising
   an external casing in which a diesel oxidation catalyst (DOC) and a bypass duct of the DOC is housed to define a bifurcation for the exhaust gases passing through the device, so that a first flow of the exhausted gases is intended to pass the DOC and a second flow of the exhausted gases is intended to bypass the DOC,
   a first injector of an urea-based reducing agent arranged at or at a point immediately downstream of the bifurcation for injecting the urea-based reducing agent in the second flow and
   an electric heater arranged annularly with respect to the bypass duct and configured to heat the bypass duct and to be passed by the first flow.

2. The device according to claim 1, wherein a rotational solid is defined according to a development axis and the bypass duct is disposed spaced apart from the external casing and is arranged in a coaxial position with the development axis.

3. The device according to claim 1, further comprising an inlet duct of the exhaust gas, arranged to introduce the exhausted gas in an incident manner with respect to a direction identified by the bypass duct and wherein the first injector of the urea-based reducing agent is arranged coaxially with respect to the bypass duct at the bifurcation.

4. The device according to claim 1, wherein the electric heater is configured to heat primarily the bypass duct and secondarily the first flow of the exhausted gases.

5. The device according to claim 1, wherein the electric heater, according to a cross-section of the electric heater, comprises straight and radial fins or folded fins, each in the form of an S, or defines a matrix.

6. An exhaust gas post-treatment system comprising the device according to claim 1, arranged to be a first abatement device encountered by the exhausted gasses.

7. The exhaust gas post-treatment system according to claim 6, further comprising
   a second abatement device, placed immediately downstream of the first abatement device and comprising a selective catalyst (SCR) and an ammonia abatement (CUC) and
   a third abatement device, placed immediately downstream of the second abatement device and comprising a DOC and a particle filter (DPF).

8. The exhaust gas post-treatment system according to claim 7, further comprising
   a fourth abatement device, arranged downstream of the third abatement device and comprising a second injector of the urea-based reducing agent arranged immediately upstream of the fourth abatement device.

9. The exhaust gas post-treatment system according to claim 6, further comprising
   a second abatement device, arranged immediately downstream of the first abatement device and comprising an SCR on filter (SCRoF).

10. The exhaust gas post-treatment system according to claim 9, further comprising
    a fourth abatement device, arranged downstream of the second abatement device and comprising a second injector of the urea-based reducing agent arranged immediately upstream of the fourth abatement device.

11. The exhaust gas post-treatment system according to claim 8, wherein the first injector of the urea-based reducing agent is configured to be activated at cold starting and maintained active as long as a temperature of the fourth abatement device is below a first predetermined temperature threshold and wherein the second injector of the urea-based reducing agent is configured to be activated when the temperature of the fourth abatement device exceeds a second predetermined temperature threshold lower than the first predetermined temperature threshold.

12. The exhaust gas post-treatment system according to claim 10, wherein the first injector of the urea-based reducing agent is configured to be activated at cold starting and maintained active as long as a temperature of the fourth abatement device is below a first predetermined temperature threshold and wherein the second injector of the urea-based reducing agent is configured to be activated when the temperature of the fourth abatement device exceeds a second predetermined temperature threshold lower than the first predetermined temperature threshold.

13. A propulsion system comprising a diesel internal combustion engine comprising the device according to claim 1, operatively connected to an exhaust manifold of the diesel internal combustion engine.

14. A propulsion system comprising a diesel internal combustion engine comprising the exhaust gas post-treatment system according to claim 6, operatively connected to an exhaust manifold of the diesel internal combustion engine.

* * * * *